United States Patent [19]

Krouse

[11] Patent Number: 5,287,029
[45] Date of Patent: Feb. 15, 1994

[54] CASING WITH INTEGRAL MOUNTING FOR AN ELECTRIC MOTOR

[75] Inventor: Jeffrey E. Krouse, Carlisle, Pa.

[73] Assignee: General Signal Corporation, Stamford, Conn.

[21] Appl. No.: 773,794

[22] Filed: Oct. 9, 1991

[51] Int. Cl.⁵ .................. H02K 5/04; F16M 13/00
[52] U.S. Cl. ............................ 310/89; 310/91; 248/671
[58] Field of Search ............. 248/56, 225.1, 671; 310/42, 43, 89, 91, 40 MM, 154, 258

[56] References Cited

U.S. PATENT DOCUMENTS

| | | | |
|---|---|---|---|
| 2,668,925 | 2/1954 | Bloser | 310/258 |
| 3,114,061 | 12/1963 | Michel et al. | 310/60 |
| 3,121,813 | 2/1964 | Pratt et al. | 310/50 |
| 3,508,327 | 4/1970 | Diederichs et al. | 29/596 |
| 3,536,943 | 10/1970 | Bowen, III et al. | 310/50 |
| 3,694,680 | 9/1972 | Jacyno | 310/50 |
| 4,116,410 | 9/1978 | Boyd, Jr. et al. | 248/26 |
| 4,195,217 | 3/1980 | Moller et al. | 219/370 |
| 4,767,914 | 8/1988 | Glucksman | 219/370 |
| 4,833,283 | 5/1989 | Andis et al. | 200/302.1 |
| 4,865,290 | 9/1989 | Weeks | 248/674 |
| 5,048,269 | 9/1991 | Deni | 53/512 |

Primary Examiner—Steven L. Stephan
Assistant Examiner—D. R. Haszko
Attorney, Agent, or Firm—Milton E. Kleinman; Robert R. Hubbard; Robert S. Smith

[57] ABSTRACT

An electric motor and motor cradle apparatus for holding the motor. The electric motor includes opposed slots on opposite surfaces thereof. The opposed slots are engaged by opposed ribs in the cradle assembly to hold the motor. The ribs may be coplanar and mutually abutting. In some forms of the invention the apparatus also include additional pairs of coplanar abutting ribs that are dimensioned and configured to engage the motor at surfaces spaced from the slot.

16 Claims, 2 Drawing Sheets

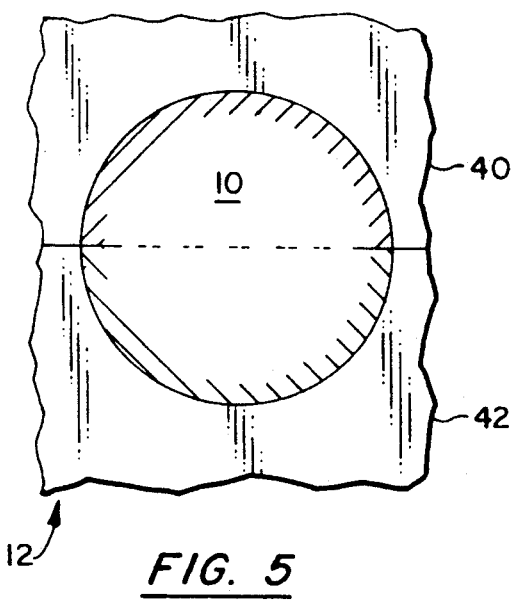
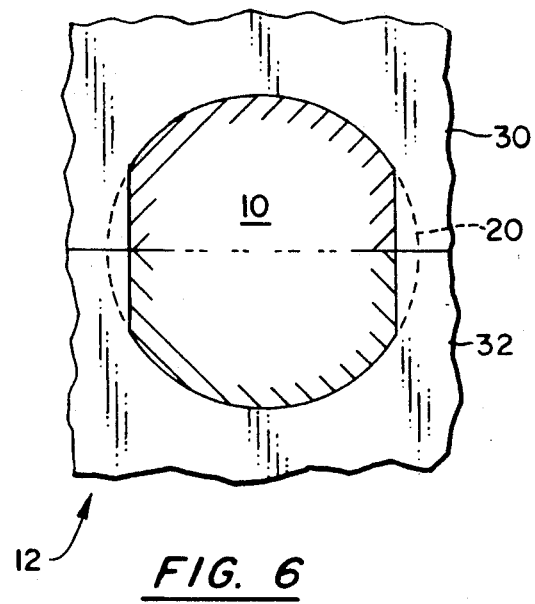

CASING WITH INTEGRAL MOUNTING FOR AN ELECTRIC MOTOR

BACKGROUND OF THE INVENTION

The invention relates to small electric motors and particularly to means for mounting such motors in a casing such as the casing of an end use apparatus. For example, the motor used in a vacuum cleaner is typically carried within a casing. The casing often is plastic.

The prior art includes various bolts and pins that engage openings to position and lock a motor into a casing. This approach has not been satisfactory because the time required to install the motor is too great and the structure is too complex.

It is an object of the invention to provide apparatus which will permit the rapid and easy installation of a motor into a casing.

It is also an object of the invention to provide both radial and axial support to a motor in a casing.

It is an object of the invention to provide apparatus which is inexpensive to manufacture as well as requires a minimum of labor to install.

SUMMARY OF THE INVENTION

It has now been found that these and other objects of the invention may be attained in a motor and motor cradle apparatus which includes an electric motor, the electric motor including at least one slot on a first exterior surface thereof and a cradle assembly for holding the motor that includes a first rib dimensioned and configured for engaging the first slot, the first rib engaging the first slot.

The motor may further includes a second slot on a second exterior surface thereof. The second slot may be dimensioned and configured to engage the first rib and the second exterior surface may be disposed in opposed relationship to the first exterior surface and the first rib may engage the second slot.

The apparatus may also include a second rib in the cradle assembly dimensioned and configured to engage both the first and second slots, the second rib engaging both the first and second slots. The first and second ribs may be coplanar and may be disposed in abutting relationship. The cradle assembly may further include a third rib which is dimensioned and configured to engage the exterior surface of the motor and which does engage the exterior surface of the motor.

The cradle assembly may further includes a fourth rib which is dimensioned and configured to engage the exterior surface of the motor and does engage the exterior surface of the motor. The third and forth ribs are disposed in substantially coplanar abutting relationship in some forms of the invention. In some forms of the invention the cradle assembly further includes a fifth rib which is dimensioned and configured to engage the exterior surface of the motor and does engage the exterior surface of the motor in spaced relationship to the first, second, third and fourth ribs. In some cases the cradle assembly further includes a sixth rib which is dimensioned and configured to engage the exterior surface of the motor and does engage the exterior surface of the motor. The fifth and sixth ribs may be disposed in substantially abutting coplanar relationship.

Various forms of the invention include the a motor cradle apparatus as described above for cooperation with an associated motor and a motor as described above for cooperation with an association cradle.

BRIEF DESCRIPTION OF THE DRAWING

The invention will be better understood by reference to the accompanying drawing in which:

FIGS. 5 and 6 are partially schematic sectional views taken respectively along the lines 5-5 and 6-7 of FIG. 4.

DESCRIPTION OF THE PREFERRED EMBODIMENT

Figure 1:
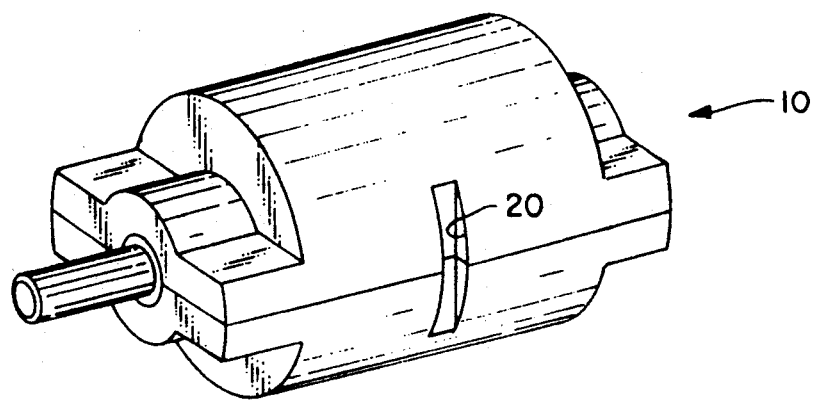
FIG. 1 is a partly schematic perspective view of a typical small electric motor that incorporates a part of the apparatus in accordance with one form of the invention.
Figure 2:
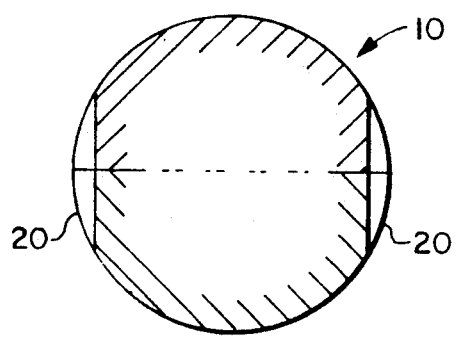
FIG. 2 is a transverse sectional view taken through the groove in the side of the motor shown in FIG. 1.
Figure 3:
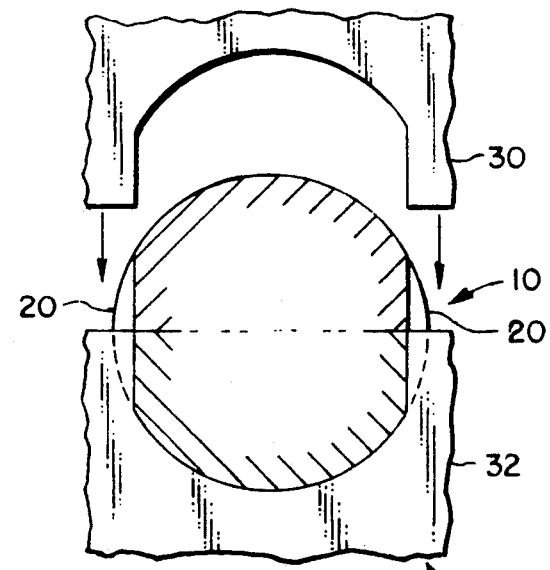
FIG. 3 is a partially schematic view of a transverse ribs that engage the slot shown in FIGS. 1 and 2.
Figure 4:
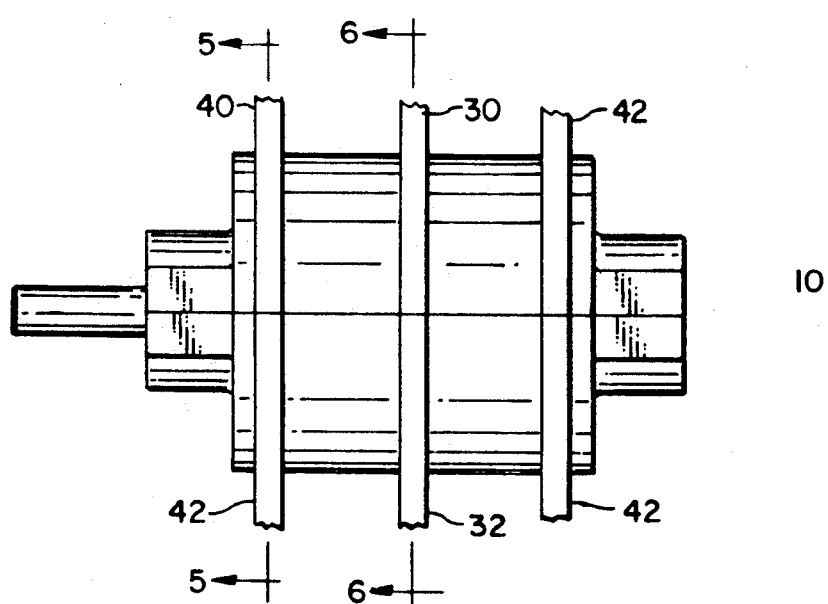
FIG. 4 is a partially schematic elevational view showing additional ribs that cradle the motor.

Referring now to FIGS. 1-6 there is shown a motor 10 that is typically manufactured by a company specializing in the manufacture of such motors and is then installed in an outer housing or casing 12 that is part of some other appliance. For example, the appliance may be a vacuum cleaner. It will be understood that the motor 10 must be securely mounted so that it does not move relative to the housing 12 and the output shaft 14 must be precisely located with respect to a driven mechanism (not shown). For example, the driven mechanism may be a rotary fan or blower. Stated another way, the location requirement is that the output shaft 14 is properly aligned as well as having the proper axial position relative to the driven mechanism.

In the preferred form of the invention the motor 10 has a vertically extending slot 20 on each of two diametrically opposed sides of the motor 10. (The motor may be manufactured from two generally cylindrical sections and the slot 20 may extend through both generally cylindrical sections.) Similarly, the outer housing 12 may comprise two generally cylindrical halves although the casing or housing 12 may have various forms depending on the appliance or other apparatus that is involved. Accordingly, only the portions essential to the invention are shown.

The housing 12 may be of clam shell design or may have discreet upper and lower portions that substantially surround the motor 10. The housing 12 includes an upper generally U-shaped transverse rib 30 that is typically molded as part of the housing 12 and which is dimensioned and configured to snugly engage the slots 20. Similarly, a lower generally U-shaped transverse rib 32 that is also typically molded as part of the housing 12 and which is dimensioned and configured to snugly engage the slots 20. In the illustrated embodiment the parting line between the rib 30 and rib 32 is within a plane that longitudinally bisects the motor 10. This will be most evident in FIG. 6.

It will be understood that in the preferred embodiment of the invention the ribs 30, 32 are disposed in mutually abutting generally coplanar relationship. In other embodiments of the invention the ribs 30, 32 need not be mutually abutting and do not even have to be coplanar. For example another slot 20 may be provided that is axially spaced from the one shown in the drawing. Thus, in this form of the invention a rib 30 may engage one slot 20 and a rib 32 may engage another slot 20.

The motor 10 will preferably be further positioned or cradled by two sets of generally arcuate transverse ribs 40, 42 that engage the outer surface of the motor. Although the ribs 40, 42 are shown and described as arcuate because motors are usually generally cylindrical it will be understood that in other forms of the invention the edge of the ribs 40, 42 may have other shapes to conform to the outer envelope of the motor 10.

Some forms of the invention may also utilize posts that engage apertures in the motor to further locate the motor within the final assembly.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. A motor apparatus for cooperation with an associated cradle assembly for holding the motor that includes at least a first rib which comprises:
   an electric motor, having an output shaft and a casing having a first exterior surface, said electric motor including at least one slot on said first exterior surface thereof, said slot having opposed generally planar walls that are disposed in generally parallel spaced relationship.

2. The apparatus as described in claim 1 wherein:
   said motor further includes a second slot on a second exterior surface thereof, said second slot being dimensioned and configured to engage the associated first rib, said second exterior surface being disposed in opposed relationship to said first exterior surface.

3. A motor and motor cradle apparatus which comprises:
   an electric motor, said electric motor including at least one slot on a first exterior surface thereof; and
   a cradle assembly for holding said motor that includes
   a first rib dimensioned and configured for snugly engaging said first slot, said first rib engaging said first slot., said motor including a casing that is the exterior surface of said motor and said motor further includes a second slot on a second exterior surface thereof, said second slot being dimensioned and configured to engage said first rib, said second exterior surface being disposed in opposed relationship to said first exterior surface, each of said first and second slots having generally planar side walls disposed in generally planar spaced relationship.

4. The apparatus as described in claim 3 wherein:
   said first rib engages said second slot.

5. The apparatus as described in claim 4 further including:
   a second rib in said cradle assembly dimensioned and configured to engage both said first and second slots, said second rib engaging both said first and second slots.

6. The apparatus as described in claim 5 wherein:
   said first and second ribs are coplanar.

7. The apparatus as described in claim 6 wherein:
   said first and second ribs are disposed in abutting relationship.

8. The apparatus as described in claim 7 wherein:
   said cradle assembly further includes a third rib which is dimensioned and configured to engage the exterior surface of said motor and does engage the exterior surface of said motor.

9. The apparatus as described in claim 7 wherein:
   said cradle assembly further includes a fourth rib which is dimensioned and configured to engage the exterior surface of said motor and does engage the exterior surface of said motor.

10. The apparatus as described in claim 9 wherein:
    said third and forth ribs are disposed in substantially coplanar relationship.

11. The apparatus as described in claim 10 wherein:
    said third and forth ribs are disposed in abutting relationship.

12. The apparatus as described in claim 11 wherein:
    said cradle assembly further includes a fifth rib which is dimensioned and configured to engage the exterior surface of said motor and does engage the exterior surface of said motor in spaced relationship to said first, second, third and fourth ribs.

13. The apparatus as described in claim 12 wherein:
    said cradle assembly further includes a sixth rib which is dimensioned and configured to engage the exterior surface of said motor and does engage the exterior surface of said motor.

14. The apparatus as described in claim 13 wherein:
    said fifth and sixth ribs are disposed in substantially coplanar relationship.

15. The apparatus as described in claim 14 wherein:
    said fifth and sixth ribs are disposed in abutting relationship.

16. A motor cradle apparatus for cooperation with an associated motor having at least one slot in a first exterior surface thereof which comprises:
    a first rib dimensioned and configured for snugly engaging at least said first slot, said first rib engaging said first slot; and
    a second rib dimensioned and configured to engage said first slot in the associated motor, said first and second ribs being coplanar, abutting relationship.

* * * * *